United States Patent
Shibahara

(10) Patent No.: US 9,291,229 B2
(45) Date of Patent: Mar. 22, 2016

(54) SHOCK ABSORBER

(71) Applicant: HITACHI AUTOMOTIVE SYSTEMS, LTD., Ibaraki (JP)

(72) Inventor: Kazuaki Shibahara, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 64 days.

(21) Appl. No.: 14/033,580

(22) Filed: Sep. 23, 2013

(65) Prior Publication Data
US 2014/0090941 A1    Apr. 3, 2014

(30) Foreign Application Priority Data
Sep. 28, 2012   (JP) ................ 2012-218343

(51) Int. Cl.
*F16F 9/34*    (2006.01)
*F16F 9/18*    (2006.01)
*F16F 9/32*    (2006.01)
*F16F 9/348*   (2006.01)

(52) U.S. Cl.
CPC . *F16F 9/18* (2013.01); *F16F 9/325* (2013.01); *F16F 9/3482* (2013.01)

(58) Field of Classification Search
CPC ......... F16F 9/18; F16F 9/3235; F16F 9/3242; F16F 3/185; F16F 3/3282
USPC ........ 188/315, 322.13, 322.17, 322.19, 322.2
See application file for complete search history.

(56) References Cited

U.S. PATENT DOCUMENTS

| | | | | |
|---|---|---|---|---|
| 3,874,485 A | * | 4/1975 | Smith | 188/298 |
| 4,440,273 A | * | 4/1984 | Butler | 188/315 |
| 4,673,068 A | * | 6/1987 | De Bruijn | 188/315 |
| 4,749,070 A | * | 6/1988 | Moser et al. | 188/266.2 |
| 4,955,460 A | * | 9/1990 | Lizell et al. | 188/281 |
| 4,971,180 A | * | 11/1990 | Kobayashi et al. | 188/282.4 |
| 5,211,268 A | * | 5/1993 | Lizell et al. | 188/281 |
| 5,325,942 A | * | 7/1994 | Groves et al. | 188/282.6 |
| 5,363,945 A | * | 11/1994 | Lizell et al. | 188/281 |
| 5,577,579 A | * | 11/1996 | Derr | 188/315 |
| 6,527,093 B2 | * | 3/2003 | Oliver et al. | 188/322.2 |
| 6,581,733 B2 | * | 6/2003 | Kazmirski | 188/275 |
| 6,926,128 B2 | * | 8/2005 | Barbison et al. | 188/315 |
| 6,974,005 B2 | * | 12/2005 | Lutz et al. | 188/371 |
| 7,438,164 B2 | * | 10/2008 | Groves et al. | 188/315 |
| 8,511,447 B2 | * | 8/2013 | Nowaczyk et al. | 188/315 |

(Continued)

FOREIGN PATENT DOCUMENTS

JP    2003-74614    3/2003

*Primary Examiner* — Thomas Irvin
(74) *Attorney, Agent, or Firm* — Wenderoth, Lind & Ponack, L.L.P.

(57) ABSTRACT

An inner tube as a cylinder includes an axially extending tubular portion, a large-diameter portion, and a tapered portion. The large-diameter portion is located at one end side of the tubular portion and is formed so as to have a diameter increased radially outwardly. The tapered portion is located between the large-diameter portion and the tubular portion, and is formed in such a manner that the diameter thereof increases in a flaring manner from the one end of the tubular portion to the large-diameter portion. A tubular protrusion of a rod guide is fittedly attached to the inner circumferential side of the large-diameter portion. A valve mounting portion is formed at the inner circumferential side of the tubular portion. A valve mechanism is mounted on the valve mounting portion. A seat surface is formed at the back side of the valve mounting portion.

20 Claims, 5 Drawing Sheets

(56) References Cited

U.S. PATENT DOCUMENTS

| | | | |
|---|---|---|---|
| 8,616,351 B2 * | 12/2013 | Roessle et al. | 188/282.4 |
| 2008/0087512 A1 * | 4/2008 | Vanhees et al. | 188/322.13 |
| 2010/0263973 A1 * | 10/2010 | Hall | 188/313 |

* cited by examiner

SHOCK ABSORBER

BACKGROUND OF THE INVENTION

The present invention relates to a shock absorber preferably used to damp an oscillation of, for example, an automobile and a rail vehicle.

As a shock absorber used for an automobile, a rail vehicle, and the like, there is known a double tube damper configured in such a manner that an interior of a cylinder is divided into a rod-side chamber and an opposite rod-side chamber (a bottom-side chamber) by a piston, and a reservoir chamber is defined outside the cylinder. As a kind of such a damper, there is a biflow-type shock absorber (damper) in which hydraulic fluid in the rod-side chamber is transmitted into the reservoir chamber in one direction and hydraulic fluid in the reservoir chamber is also transmitted into the opposite rod-side chamber in the one direction during an extension stroke of a piston rod. During a compression stroke of the piston rod, hydraulic fluid in the opposite rod-side chamber is transmitted into the reservoir chamber in another direction and hydraulic fluid in the reservoir chamber is also transmitted into the rod-side chamber in the other direction. Therefore, as disclosed in Japanese Patent Application Disclosure No. 2003-74614, a suction valve of poppet valve type is provided at a rod guide that slidably supports the piston rod.

The biflow-type double-tube shock absorber according to the above-described conventional technique delivers the hydraulic fluid from the reservoir chamber into the rod-side chamber as if sucking it by opening the suction valve of poppet valve type during the compression stroke. However, the hydraulic fluid may be unable to be sucked sufficiently at this time, whereby a plurality of suction valves (poppet valves) has to be provided to ensure sufficient suction. Therefore, the conventional technique has such a problem that not only the plurality of suction valves increases cost of the shock absorber but also obtaining a space for mounting these suction valves within the rod guide makes a size reduction of the shock absorber difficult.

SUMMARY OF THE INVENTION

The present invention has been contrived in consideration of the above-described problem of the conventional technique, and an object of the present invention is to provide a shock absorber capable of obtaining a space for disposing a valve mechanism in a rod guide while increasing a suction flow amount.

To achieve the above-described object, one aspect of the present invention is a shock absorber including an annular cylinder in which hydraulic fluid is sealingly contained, a reservoir chamber in which the hydraulic fluid and gas are sealingly contained, a piston slidably and fittedly inserted in the cylinder and dividing an interior of the cylinder into a rod-side chamber and an opposite rod-side chamber, a piston rod extending from one end of the cylinder to an outside, and a rod guide disposed at one end side of the cylinder and configured to slidably support the piston rod. A large-diameter portion is provided at the one end side of the cylinder. The large-diameter portion has a diameter increased radially outwardly and is configured in such a manner that the rod guide is fitted therein. A passage is formed at the rod guide so as to establish communication between the rod-side chamber and the reservoir chamber. A valve mechanism is disposed at the passage.

Another aspect of the present invention is a shock absorber including an annular cylinder in which hydraulic fluid is sealingly contained, a reservoir chamber in which the hydraulic fluid and gas are sealingly contained, a piston slidably provided in the cylinder and dividing an interior of the cylinder into a rod-side chamber and an opposite rod-side chamber, a piston rod extending from one end of the cylinder to an outside, a base valve defining the opposite rod-side chamber and the reservoir chamber, a rod guide disposed at one end side of the cylinder and configured to slidably support the piston rod, and a first passage and a second passage through which the hydraulic fluid flows according to a movement of the piston. A large-diameter portion is provided at the one end of the cylinder. The large-diameter portion is configured in such a manner that the rod guide is fitted therein. A first damping force generation mechanism and a first check valve are disposed at the first passage. The first damping force generation mechanism is configured to generate a damping force by controlling a flow of the hydraulic fluid flowing from the rod-side chamber during an extension stroke. The first check valve is provided at the base valve and is configured to allow a flow of the hydraulic fluid from the reservoir chamber into the opposite rod-side chamber. A second damping force generation mechanism and a second check valve are disposed at the second passage. The second damping force generation mechanism is configured to generate a damping force by controlling a flow of the hydraulic fluid flowing from the opposite rod-side chamber during a compression stroke. The second check valve is provided at the rod-side chamber and is configured to allow a flow of the hydraulic fluid from the reservoir chamber into the rod-side chamber. At least a part of the second passage is formed at the rod guide.

DESCRIPTION OF THE EMBODIMENTS

In the following description, a shock absorber according to embodiments of the present invention will be described based on an example in which it is employed for a biflow-type hydraulic shock absorber configured to be horizontally mounted and having a double tube structure that is used to damp an oscillation generated when a rail vehicle rolls or a bogie zigzags. The embodiments of the present invention will be described in detail with reference to the accompanying drawings.

Figure 1:
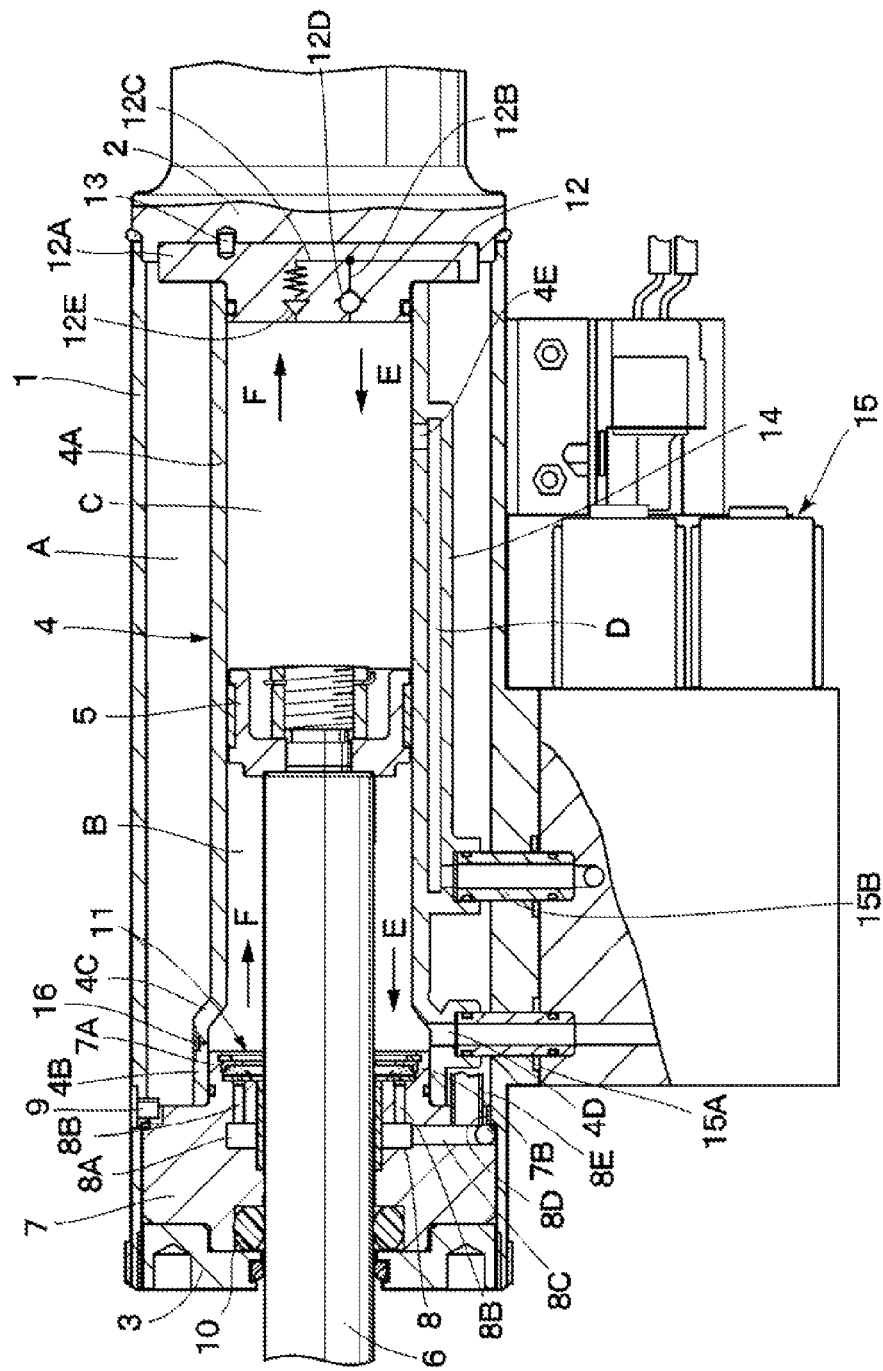
FIG. 1 is a vertical cross-sectional view illustrating a hydraulic shock absorber configured to be horizontally mounted according to a first embodiment of the present invention.
Figure 2:
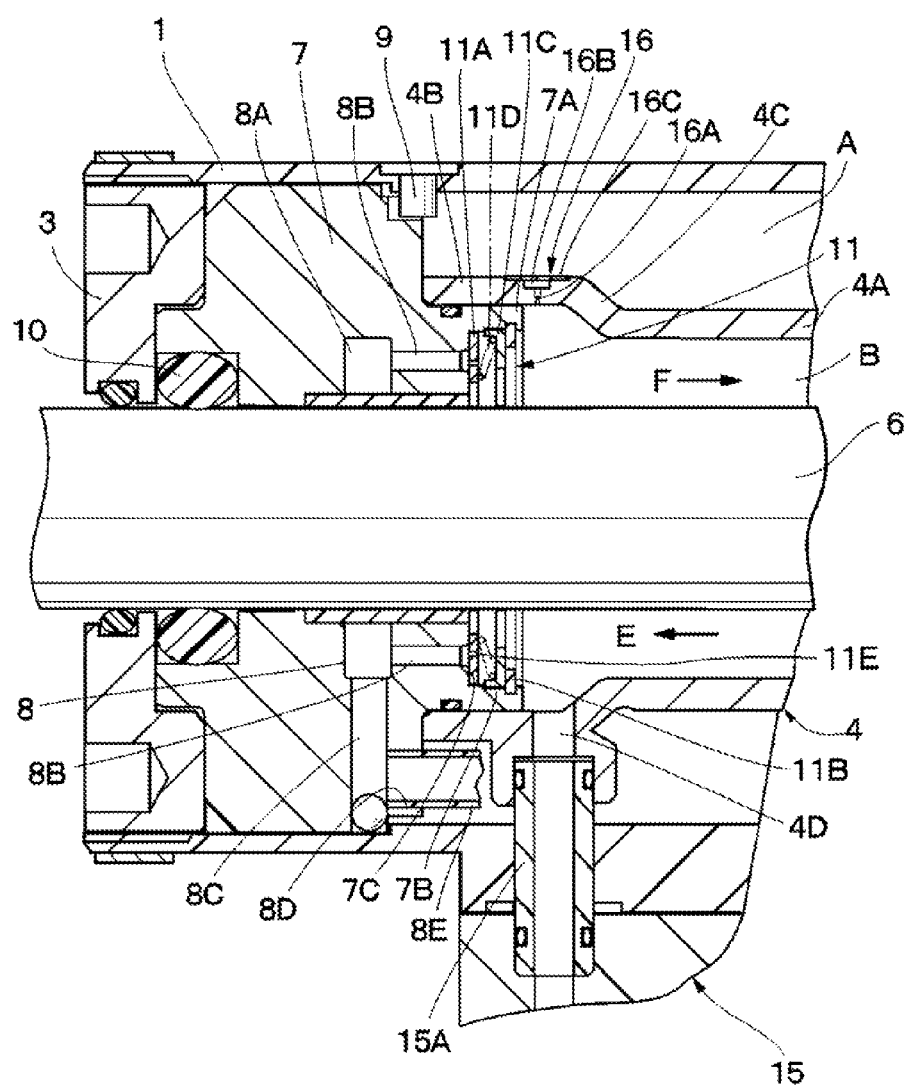
FIG. 2 is an enlarged cross-sectional view illustrating an outer tube, an inner tube, a rod guide, a valve mechanism, and the like in the shock absorber illustrated in FIG. 1.

FIGS. 1 and 2 illustrate a first embodiment of the present invention. Referring to FIG. 1, an outer tube 1 serves as an outer shell of a biflow-type hydraulic shock absorber configured to be horizontally mounted and having a double tube structure. The outer tube 1 is constituted by a circular tubular body extending in an axial direction (the left-right direction in FIG. 1). A cover body 3 and a rod guide 7, which will be described below, are provided to one end side (hereinafter referred to as a left end side) of the outer tube 1. A base cap 2 is fixedly attached to another end side (hereinafter referred to as a right end side) of the outer tube 1 with use of a welding means. The right end side of the outer tube 1 is closed by the base cap 2. The base cap 2 may be fixedly attached to the outer tube 1 by not only the welding means but also another means such as screwing or swaging.

The cover body 3 is disposed at an axially opposite side of the outer tube 1 from the base cap 2. The left end side of the outer tube 1 is closed by the cover body 3. The rod guide 7 is sandwiched from the axial both sides between the cover body 3 and an inner tube 4, which will be described below. As a result, the rod guide 7 is held in the outer tube 1 in a state prevented the rod guide 7 from being pulled out therefrom.

The inner tube 4 as a cylinder is disposed coaxially with the outer tube 1 within the outer tube 1. The inner tube 4 is constituted by a cylindrical tubular portion 4A, a large-diameter portion 4B, and a tapered portion 4C as an integrated member. The tubular portion 4A forms a piston sliding portion in which a piston 5 slides, and axially extends. The piston 5 will be described below. The large-diameter portion 4B has a large diameter, and is located at the left end side of the tubular portion 4A and is formed so as to have a diameter increased radially outwardly. The tapered portion 4C is located between the large-diameter portion 4B and the tubular portion 4A, and is formed in such a manner that the diameter thereof increases in a flaring manner from the left end of the tubular portion 4A to the large-diameter portion 4B.

A valve body 12A of a base valve 12, which will be described below, is fittedly attached to the inner circumference of the right end side of the tubular portion 4A of the inner tube 4. The rod guide 7, which will be described below, is fittedly attached to the inner circumferential side of the large-diameter portion 4B, which has a larger diameter than the tubular portion 4A. Oil as hydraulic fluid is sealingly contained in the inner tube 4. The hydraulic fluid may be embodied by not only oil but also, for example, water containing an additive agent.

An annular reservoir chamber A is defined between the inner tube 4 and the outer tube 1. Gas is sealingly contained in the reservoir chamber A together with the oil. This gas may be air under atmospheric pressure, or may be gas such as compressed nitrogen gas. In the case of the hydraulic shock absorber configured to be horizontally mounted, the oil is contained in the lower side relative to the gas sealingly contained in the reservoir chamber A. In other words, in the reservoir chamber A, the oil is collected in the lower side in the vertical direction as viewed in FIG. 1 or 2, and the gas remains in the upper side in the vertical direction. The gas in the reservoir chamber A is compressed during a movement of the piston rod 6 in a compression direction (a compression stroke) to accommodate a volume of the piston rod 6 entering in the inner tube 4.

A tubular protrusion 7A of the rod guide 7, which will be described below, is attached in a fitted state to the inner circumferential side of the large-diameter portion 4B formed at the left end side of the inner tube 4. Further, a gas release passage 16, which will be described below, is formed at the large-diameter portion 4B. Further, a radially extending oil hole 4D is formed at the large-diameter portion 4B at a position lower than this gas release passage 16. The oil in a rod-side chamber B is introduced or discharged into a damping force adjustment apparatus 15 via the oil hole 4D and a rod-side connection passage 15A. The rod-side chamber B and the damping force adjustment apparatus 15 will be described below. Further, another oil hole 4E is formed at a position axially spaced apart (in the right direction as viewed in FIG. 1) from the oil hole 4D at the large-diameter portion 4B in the inner tube 4. The oil hole 4E is formed as a radially extending hole for establishing constant communication between an opposite rode-side chamber C and an intermediate chamber D, which will be described below.

A piston 5 is slidably and fittedly inserted in the inner tube 4. The piston 5 divides the interior of the inner tube 4 into the rod-side chamber B and the opposite rod-side chamber C, which is normally called a bottom-side chamber. The piston 5 is disposed in the inner tube 4 as a movable partitioning wall, and communication between the rod-side chamber B and the opposite rod-side chamber C is constantly blocked by the piston 5. In other words, the rod-side chamber B is only in communication with the reservoir chamber A, and is not in communication with the opposite rode-side chamber C via the piston 5. Further, the opposite rod-side chamber C is only in communication with the reservoir chamber A, and is not in communication with the rod-side chamber B via the piston 5. Due to this configuration, the present hydraulic shock absorber has a biflow structure.

A piston rod 6 extends axially in the inner tube 4. The right end side of the piston rod 6 as a proximal end side is fixedly attached to the piston 5 in the inner tube 4. Further, the left end side of the piston 6 as a distal end side protrudes to the outside of the outer tube 1 and the inner tube 4 via the rod guide 7, the cover body 3, and the like. The rod guide 7 will be described below.

The rod guide 7 is formed into a stepped cylindrical shape, and includes an axially protruding tubular protrusion 7A at the right end side of the rod guide 7. The rod guide 7 is fitted at the outer circumferential side thereof in the outer tube 1. The inner circumferential side of the piston rod 6 axially slidably guides the piston rod 6. The tubular protrusion 7A of the rod guide 7 is fitted into the large-diameter portion 4B of the inner tube 4. As a result, the large-diameter portion 4B of the inner tube 4 is supported by the rod guide 7, and the left end side of the inner tube 4 is positioned coaxially within the outer tube 1. A valve mounting portion 7B is formed at the tubular protrusion 7A of the rod guide 7. A valve mechanism 11, which will be described below, is mounted on the inner circumferential side of the valve mounting portion 7B. A back (bottom) side of the valve mounting portion 7B serves as a seat surface 7C, which a plate-like valve 11A is seated on and separated from. The plate-like valve 11A will be described below. This seat surface 7C constitutes a seat portion, which is a part of the valve mechanism 11, and is located to face the rod-side chamber B.

As illustrated in FIG. 2, a passage 8 is formed at the rod guide 7 for establishing communication between the reservoir chamber A and the rod-side chamber B. The passage 8 includes an annular passage portion 8A, a plurality of axial passage portions 8B, one or more radial passage portion(s) 8C, and communication hole(s) 8D. The annular passage portion 8A extends around the outer circumferential side of the piston rod 6 along the entire circumference in the circumferential direction. The plurality of axial passage portions 8B is formed so as to be spaced apart from one another along the circumferential direction of the annular passage portion 8A, and axially extends between the seat surface 7C and the annular passage portion 8A. The one or more radial passage portion(s) 8C radially outwardly extend(s) from the outer circumferential side of the annular passage portion 8A. The communication hole(s) 8D establishes constant communication between the radial passage portion(s) 8C and the reservoir chamber A. An oil introduction pipe 8E, which is formed from a flexible hose, is connected to the communication hole 8D.

Figure 4:
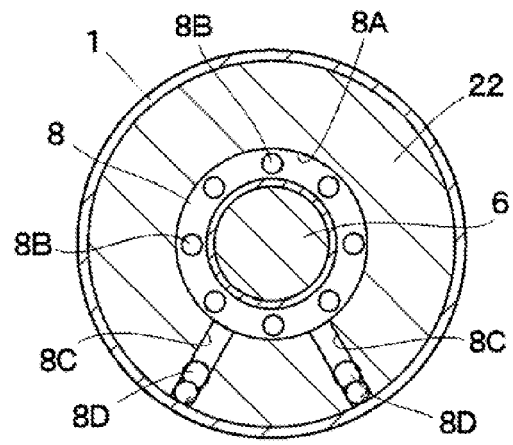
FIG. 4 is a transverse cross-sectional view illustrating an outer tube, a rod guide, and a piston rod taken along a line IV-IV illustrated in FIG. 3.

For example, as illustrated in FIG. 4 which will be described below, two portions are formed as the radial communication portion(s) 8C of the passage 8. The two radial communication portions 8C obliquely downwardly extend from lower end portions of the annular passage portion 8A. In this example, two communication holes 8D are formed to correspond to the two radial communication passages 8C. The oil introduction pipes 8E are connected to the two communication holes 8D, respectively. The oil introduction pipes 8E are located at positions preventing the respective oil introduction pipes 8E from contacting or interfering with a rod-side communication passage 15A and the like, which will be described below. Further, the respective radial communication passage portions 8C are located at positions at a lower side relative to the piston rod 6 so as to prevent the gas in the reservoir chamber A from being sucked from the respective oil introduction pipes 8E into the respective radial communication portions 8c.

A rotation preventing pin 9 is disposed at the outer tube 1 so as to be engaged with the outer circumferential side of the rod guide 7. The rotation prevention pin 9 holds the rod guide 7 so as to prevent the rod guide 7 from rotating relative to the outer tube 1. As a result, a narrow hole 16A of the gas release passage 16, which will be described below, can be held at an uppermost position of the inner tube 4 in the vertical direction as viewed in FIG. 1 or 2, thereby preventing the gas (air bubbles) from being accumulated in the inner tube 4. The rotation preventing pin 9 does not necessarily have to be formed as a separate member from the outer tube 1, and may be formed integrally with the outer tube 1 at the inner circumferential side of the outer tube 1. Further, a seal member 10 is disposed between the rod guide 7 and the cover body 3. The seal member 10 is in sliding contact with the outer circumferential side of the piston rod 6, thereby sealing between the rod guide 7 (the cover body 3) and the piston rod 6.

The valve mechanism 11 employed in the first exemplary embodiment is located in the large-diameter portion 4B of the inner tube 4, and is disposed between the valve mounting portion 7B of the rod guide 7 and the piston rod 6. The valve mechanism 11 is located at a position facing the passage 8 (the axial passage portion 8B) of the rod guide 7 within the rod-side chamber B of the inner tube 4. The valve mechanism 11 has a function of adjusting a flow amount of the oil flowing through the passage 8 and generating a damping force by an orifice hole 11E, which will be described below.

As illustrated in FIG. 2, the valve mechanism 11 includes the plate-like valve 11A, an annular spring bracket 11C, a valve spring 11D constituted by an annular disk, and a plurality of orifice holes 11E. The plate-like valve 11A is inserted to reach a position at the back end side in the valve mounting portion 7B of the rod guide 7, and is seated on and separated from the seat surface 7C. The annular spring bracket 11C is positioned at a position axially spaced apart from the plate-like valve 11A on the inner circumferential side of the valve mounting portion 7B via a retaining ring 11B. The valve spring 11D is arranged between the spring bracket 11C and the plate-like valve 11A, and constantly biases the plate-like valve 11A in a valve closing direction. The plurality of orifice holes 11E is pierced through the plate-like valve 11A.

The plate-like valve 11A of the valve mechanism 11 is kept seated on the seat surface 7C of the rod guide 7 to maintain a valve closed state by a pressure of the oil flowing from the rod-side chamber B toward the inside of the passage 8 during an extension stroke of the piston rod 6, and the biasing force of the valve spring 11D. At this time, the oil in the rod-side chamber B flows into the passage 8 (the axial passage portions 8B) via the respective orifice holes 11E. Further, the oil in the rod-side chamber B flows through the narrow hole 16A of the gas release passage 16. Therefore, the respective orifice holes 11E and the narrow hole 16A generate a damping force in an extension direction by applying orifice resistance to the oil flowing from the rod-side chamber B into the passage 8 and the gas release passage 16 during the extension stroke of the piston rod 6. In this manner, the respective orifice holes 11E and the narrow hole 16A constitute a first damping force generation mechanism.

On the other hand, during a compression stroke of the piston rod 6, the oil in the reservoir chamber A flows into the rod-side chamber B via the passage 8 (i.e., the oil introduction pipes 8E, the communication holes 8D, the radial passage portions 8C, the annular passage portion 8A, and the axial passage portions 8B). Therefore, the plate-like valve 11A of the valve mechanism 11 serves as a so-called suction valve by being separated from the seat surface 7C (opening the valve) against the biasing force of the valve spring 11D, thereby ensuring that the oil in the reservoir A is sucked into the rod-side chamber B. In this manner, the plate-like valve 11A constitutes a second check valve that allows a flow of the oil from the reservoir chamber A into the rod-side chamber B.

The plate-like valve 11A is formed from an annular disk with a through-hole formed on the inner circumferential side thereof. The piston rod 6 extends through the plate-like valve 11A via the through-hole. As illustrated in FIG. 1, the outer dimension of the plate-like valve 11A is larger than the outer diameter of the piston 5 (i.e., the inner diameter of the tubular portion 4A of the inner tube 4). Therefore, it is possible to increase the flow passage of the through-hole formed at the plate-like valve 11A compared to a plate-like valve having a same diameter as the outer diameter of the piston 5. When the plate-like valve 11A is opened, the flow passage can be widened compared to the plate-like valve having a same diameter as the outer diameter of the piston 5. This is because the through-hole of the plate-like valve 11A formed at the inner circumferential side is also used as the flow passage. Thus it becomes possible to increase a suction flow amount of the oil sucked from the reservoir chamber A into the rod-side chamber B via the passage 8.

The base valve 12 is located at the right end side of the inner tube 4, and is disposed between the base cap 2 and the inner tube 4. As illustrated in FIG. 1, this base valve 12 includes a valve body 12A, a first passage portion 12B and a second passage portion 12C, a first check valve 12D, and a second damping force generation mechanism 12E. The valve body 12A is fittedly and fixedly attached between the inner surface of the base cap 2 and the right end of the inner tube 4. The first passage portion 12B and the second passage portion 12C are formed at the valve body 12A in a parallel relationship with each other. The check valve 12D is disposed at the first passage portion 12B of the valve body 12A. The second damping force generation mechanism 12E is disposed at the second passage portion 12C of the valve body 12A.

The first passage portion 12B of the base valve 12 constitutes a first passage of the biflow-type shock absorber according to the present invention, together with the passage 8 at the rod guide 7, the respective orifice holes 11E of the valve mechanism 11, and the like. In other words, in the biflow-type shock absorber, the first check valve 12D is opened during an extension stroke of the piston rod 6, whereby the oil in the reservoir chamber A flows into the opposite rod-side chamber C in one direction (a direction indicated by an arrow E in FIG. 1). At this time, the respective orifice holes 11E of the valve mechanism 11 allow the oil to flow from the rod-side chamber B into the passage 8 in the direction indicated by the arrow E. Further, the oil flows into the reservoir chamber A through the narrow hole 16 of the gas release passage 16. At this time, the orifice holes 11E and the narrow hole 16A provides orifice resistance to the oil, respectively, to generate a damping force in the extension direction. In this manner, the orifice holes 11E and the narrow hole 16A constitute the first damping force generation mechanism.

The second passage portion 12C of the base valve 12 constitutes a second passage of the biflow-type shock absorber, together with the passage 8 at the rod guide 7, the plate-like valve 11A of the valve mechanism 11, and the like. During a compression stroke of the piston rod 6, the oil flows from the opposite rod-side chamber C toward the reservoir chamber A in another direction (a direction indicated by an arrow F in FIG. 1), and the second damping force generation mechanism 12E at the base valve 12 controls this oil flow to generate a damping force in the compression direction. At this time, the plate-like valve 11A of the valve mechanism 11 constitutes a second check valve that allows an oil flow from the reservoir chamber A into the rod-side chamber B in the direction indicated by the arrow F.

A rotation preventing pin 13 is disposed between the valve body 12A of the base valve 12 and the base cap 2. This rotation preventing pin 13 prevents the inner tube 4 and the base valve 12 from rotating relative to the base cap 2, thereby rotationally fixing the inner tube 4 and the base valve 12. Therefore, the inner tube 4, the rod guide 7, and the base valve 12 are held in a non-rotatable state relative to the outer tube 1 with use of the rotation preventing pins 9 and 13.

An intermediate wall 14 is provided between the outer tube 1 and the inner tube 4 to define the intermediate chamber D therebetween separately from the reservoir chamber A. In the present embodiment, the intermediate wall 14 is integrally formed on the outer circumferential side of the inner tube 4. However, the intermediate wall 14 may be formed as a separate body from the inner tube 4. In this case, the intermediate wall 14 may be fixedly attached to the inner tube 4 by, for example, the welding means. The intermediate wall 14 is formed so as to partially surround the outer circumferential side of the inner tube 4 from below, and extends axially so as to have a predetermined length. The intermediate chamber D is in constant communication with the opposite rod-side chamber C via the radially extending oil hole 4E formed at the inner tube 4, and establishes communication between the opposite rod-side chamber C and a bottom-side connection passage 15B, which will be described below.

An electric or electromagnetic damping force generation apparatus 15 is disposed at the outer circumferential side of the outer tube 1. As illustrated in FIG. 1, the damping force generation apparatus 15 is attached at a position on the lower surface side of the outer tube 1 from outside, and is configured integrally with the outer tube 1. The damping force generation apparatus 15 includes the rod-side connection passage 15A and the bottom-side connection passage 15B. The rod-side connection passage 15A is in communication with the rod-side chamber B in the inner tube 4 via the oil hole 4D. The bottom-side connection passage 15B is in communication with the opposite-rod side chamber C via the oil hole 4E and the intermediate chamber D. The damping force generation apparatus 15 may be located at not only a position on the lower surface side of the outer tube 1 but also any position allowing the rod-side connection passage 15A and the bottom-side connection passage 15B to be constantly positioned within the oil.

The damping force adjustment apparatus 15 includes a single control valve (not illustrated). The control valve controls an oil flow so as to allow and prohibit it between the rod-side connection passage 15A and the bottom-side connection passage 15B, and variably controls an area of a flow passage therebetween. The damping force adjustment apparatus 15 drives (displaces) the control valve according to an externally supplied control signal (a power amount) to thereby variably adjust a generated damping force within a range from a hard characteristic to a soft characteristic. In this manner, the damping force adjustment apparatus 15 can adjust a damping force during an extension stroke of the piston rod 6 and a damping force during a compression stroke of the piston rod 6 respectively independently.

The present embodiment is described based on the example that includes the damping force adjustment apparatus 15 capable of adjusting the damping force by controlling a power amount, but may employ a mechanical damping force generation apparatus that does not actively control the damping force with use of electric power.

The gas release passage 16 is a passage for discharging the gas (air bubbles) in the inner tube 4 to the reservoir chamber A. As illustrated in FIG. 2, the gas release passage 16 is pierced at the large-diameter portion 4B of the inner tube 4. More specifically, the gas release passage 16 is formed at the uppermost side of the large-diameter portion 4B of the inner tube 4 as viewed in FIG. 2 (at the opposite side from the damping force adjustment apparatus 15 disposed at the lower side as viewed in FIG. 2). The gas release passage 16 includes a vertically extending narrow hole 16A, an annular groove portion 16B, and an annular cover portion 16C. The annular groove portion 16B extends in the circumferential direction of the large-diameter portion 4B in cross section intersecting the axial direction of the piston rod 6. The uppermost portion of the annular groove portion 16B circumferentially extending in this manner in the vertical direction as viewed in FIG. 2 is in communication with the narrow hole 16A. The annular cover portion 16C is fixedly attached to the outer circumferential side of the large-diameter portion 4B so as to cover the annular groove portion 16B from outside the large-diameter portion 4B in the radial direction.

The annular groove portion 16B of the gas release passage 16 has a substantially C shape in cross section intersecting the axial direction of the piston rod 6. In other words, the annular groove portion 16B extends to form a substantially C shape along the circumferential direction of the large-diameter portion 4B. The gas (air bubbles) is caught by the narrow hole 16A formed at the uppermost side of the large-diameter portion 4B of the inner tube 4. The caught gas is guided circumferentially downwardly via the annular groove portion 16B while being discharged into the reservoir chamber A at a position at the upper side relative to, for example, the oil hole 4D. In this manner, a gas release operation is performed, as will be described below. Therefore, the annular cover portion 16C is formed as an annular cover body that covers most of the annular groove portion 16B from outside except for the lowermost portion of the annular groove portion 16B. The circumferential length of the annular groove portion 16B may be any length as long as it is at least a length corresponding to approximately a half (180 degrees) of the whole circumference of the large-diameter portion 4B.

The hydraulic shock absorber according to the first embodiment is configured in the above-described manner. Next, an operation thereof will be described.

As illustrated in FIG. 1, the present shock absorber is disposed in a horizontal state when it is used to damp a horizontal oscillation of a rail vehicle. Then, the end of the shock absorber at the base cap 2 and the end of the shock absorber at the protruding end of the piston rod 6 are attached between a bogie side and a vehicle body side of a rail vehicle (both are not illustrated). When the shock absorber is mounted on the rail vehicle in this manner, the oil is collectively contained in the lower side relative to the gas sealingly contained in the reservoir chamber A. The oil introduction pipes 8E of the passage 8 provided at the rod guide 7 are disposed in a state immersed in the oil stored in the lower side of the reservoir chamber A.

When the bogie, which runs along a track, oscillates according to running of the rail vehicle, the horizontally mounted hydraulic shock absorber disposed between the bogie and the vehicle body has an extension stroke and a compression stroke of the piston rod 6 to perform a damping operation. At this time, the shock absorber generates a damping force by the valve mechanism 11 and the base valve 12, and therefore can reduce an oscillation of the vehicle body side. Further, the shock absorber can variably adjust the generated damping force, and adjust the damping force generated during an extension stroke of the piston rod 6 and the damping force generated during a compression stroke of the piston rod 6 respectively independently, by activating the damping force adjustment apparatus 15 disposed outside the outer tube 1.

In this case, during the extension stroke of the piston rod 6, the pressure in the rod-side chamber B is higher than the pressure in the reservoir chamber A, and the pressure in the opposite rod-side chamber C is lower than the pressure in the reservoir chamber A. Therefore, the first check valve 12D of the base valve 12 is opened, whereby the oil in the reservoir chamber A flows toward the opposite rod-side chamber C in the one direction (the direction indicated by the arrow E illustrated in FIG. 1). At this time, the plurality of orifice holes 11E pierced through the plate-like valve 11A of the valve mechanism 11 and the narrow hole 16A apply orifice resistance to the oil flowing from the rod-side chamber B into the passage 8 and the gas release passage 16 in the direction indicated by the arrow E, thereby generating a damping force in the extension direction as the first damping force generation mechanism.

On the other hand, during a compression stroke of the piston rod 6, the pressure in the opposite rod-side chamber C is higher than the pressure in the reservoir chamber A, and the pressure in the rod-side chamber B is lower than the pressure in the reservoir chamber A. Therefore, the plate-like valve 11A of the valve mechanism 11 as the second check valve is opened, thereby allowing the oil to be sucked from the reservoir chamber A into the rod-side chamber B in the other direction (in the direction indicated by the arrow F in FIG. 1). Further, the second damping force generation mechanism 12E of the base valve 12 controls the oil flowing from the opposite rod-side chamber C toward the reservoir chamber A in the direction indicated by the arrow F, by which it is possible to generate a damping force in the compression direction.

Further, the damping force adjustment apparatus 15 controls the oil flow so as to allow or prohibit it between the rod-side connection passage 15A in communication with the rod-side chamber B and the bottom-side connection passage 15B in communication with the opposite rod-side chamber C via the intermediate chamber D of the intermediate wall 14, by the not-illustrated control valve disposed at the damping force adjustment apparatus 15. Further, the damping force adjustment apparatus 15 variably controls the area of the flow passage by the not-illustrated control valve, by which it is possible to adjust the damping force during an extension stroke of the piston rod 6 and the damping force during a compression stroke of the piston rod 6 respectively independently. When the communication is blocked between the rod-side connection passage 15A and the bottom-side connection passage 15B by the damping force adjustment apparatus 15, the extension-side or compression-side damping force generated by the valve mechanism 11 (the plurality of orifice holes 11E) at the rod guide 7 and the second damping force generation mechanism 12E of the base valve 12 has a hardest characteristic.

In the biflow-type shock absorber, the interior of the inner tube 4 is divided by the piston 5 into the rod-side chamber B and the opposite rod-side chamber C. Therefore, the communication is blocked between the chambers B and C by the piston 5. Therefore, the plate-like valve 11A of the valve mechanism 11 is opened during a compression stroke of the piston rod 6 to thereby allow the oil in the reservoir chamber A to flow into the rod-side chamber B as if being sucked. However, at this time, the oil might be unable to be sucked by a sufficient suction flow amount.

Therefore, according to the first embodiment, the inner tube 4 includes the axially extending tubular portion 4A, the large-diameter portion 4B positioned at the one end side of the tubular portion 4A (the left end side in FIG. 1) and formed so as to have a diameter increased radially outwardly, and the tapered portion 4C positioned between the large-diameter portion 4B and the tubular portion 4A and formed in such a manner that the diameter thereof increases from the left end of the tubular portion 4A toward the large-diameter portion 4B in a flaring manner. Then, the inner tube 4 is configured in such a manner that the tubular protrusion 7A of the rod guide 7 is fittedly attached to the inner circumferential side of the large-diameter portion 4B formed at the left end side of the inner tube 4. Further, the valve mounting portion 7B, in which the valve mechanism 11 is mounted, is formed at the inner circumferential side of the tubular protrusion 7A, and the back (bottom) side of the valve mounting portion 7B forms the seat surface 7C which the plate-like valve 11A is seated on and separated from.

Therefore, the plate-like valve 11A of the valve mechanism 11 can be formed from the annular disk with the piston rod 6 extending through the inner circumferential side thereof, and the plate-like valve 11A can have an outer diameter larger than the outer diameter of the piston 5 (i.e., the inner diameter of the tubular portion 4A of the inner tube 4). Therefore, it is possible to increase the flow passage of the through-hole formed at the plate-like valve 11A compared to the plate-like valve having a same diameter as the outer diameter of the piston 5. When the plate-like valve 11A of the valve mechanism 11A is opened during a compression stroke of the piston rod 6, the flow passage can be widened compared to the plate-like valve 11A having a same diameter as the outer diameter of the piston 5. This is because the through-hole of the plate-like valve 11A formed at the inner circumferential side is also used as the flow passage. Thus it becomes possible to increase the suction flow amount of the oil sucked from the reservoir chamber A into the rod-side chamber B via the passage 8.

Further, the gas release passage 16 is not formed at the tubular portion 4A but is formed at the large-diameter portion 4B of the inner tube 4. Further, the gas release passage 16 is formed at the vertically uppermost position of the large-diameter portion 4B, as illustrated in FIG. 1 or 2. As described above, the gas release passage 16 includes the narrow hole 16A. The gas (air bubbles) in the inner tube 4 is guided into the narrow hole 16A. The gas collected in the narrow hole 16A is discharged into the reservoir chamber A via the annular groove portion 16B of the gas release passage 16. Therefore, it is possible to provide a hydraulic shock absorber configured to be horizontally mounted, capable of eliminating, for example, such a problem that the gas remains in the oil in the inner tube 4 to change the damping force characteristic, thereby stabilizing the damping force characteristic.

In other words, during an extension stroke of the piston rod 6, a small amount of the oil in the rod-side chamber B flows out toward the reservoir chamber A via the narrow hole 16A of the gas release passage 16 formed at the uppermost position of the large-diameter portion 4B of the inner tube 4. Therefore, the gas (air bubbles) remaining at the uppermost position of the large-diameter portion 4B of the inner tube 4 is guided toward the annular groove portion 16B via the narrow hole 16A together with the small amount of the oil, realizing a gas release operation of discharging gas toward the reservoir chamber A.

According to the present embodiment, the gas release passage 16 is formed at the rod-side chamber B (i.e., the large-diameter portion 4B). In addition thereto, a similar gas release passage may be formed at the opposite rod-side chamber C. Providing the gas release passage at both the rod-side chamber B and the opposite rod-side chamber C can further stabilize the damping force characteristic.

In this manner, according to the first embodiment, it is possible to increase the outer diameter of the portion (the tubular protrusion 7A) where the rod guide 7 is fitted due to the large-diameter portion 4B formed at the left end side of the inner tube 4 to thereby obtain a space where the valve mechanism 11 is mounted, and increase the suction flow amount of the oil sucked by the valve mechanism 11, thereby realizing a reduction in the size and weight of the shock absorber. Further, providing the gas release passage 16 at the large-diameter portion 4B of the inner tube 4 allows the gas (air bubbles) left in the inner tube 4 to be easily discharged to the reservoir chamber A via the gas release passage 16 during, for example, an extension stroke of the piston rod 6.

Especially, suction insufficiency highly likely occurs in a shock absorber including a piston rod having a large diameter relative to a diameter of an inner tube. However, according to the present embodiment, the diameter of the inner tube partially increases, whereby it is possible to reduce the size of the shock absorber while increasing the suction flow amount or suction flow rate.

Figure 3:
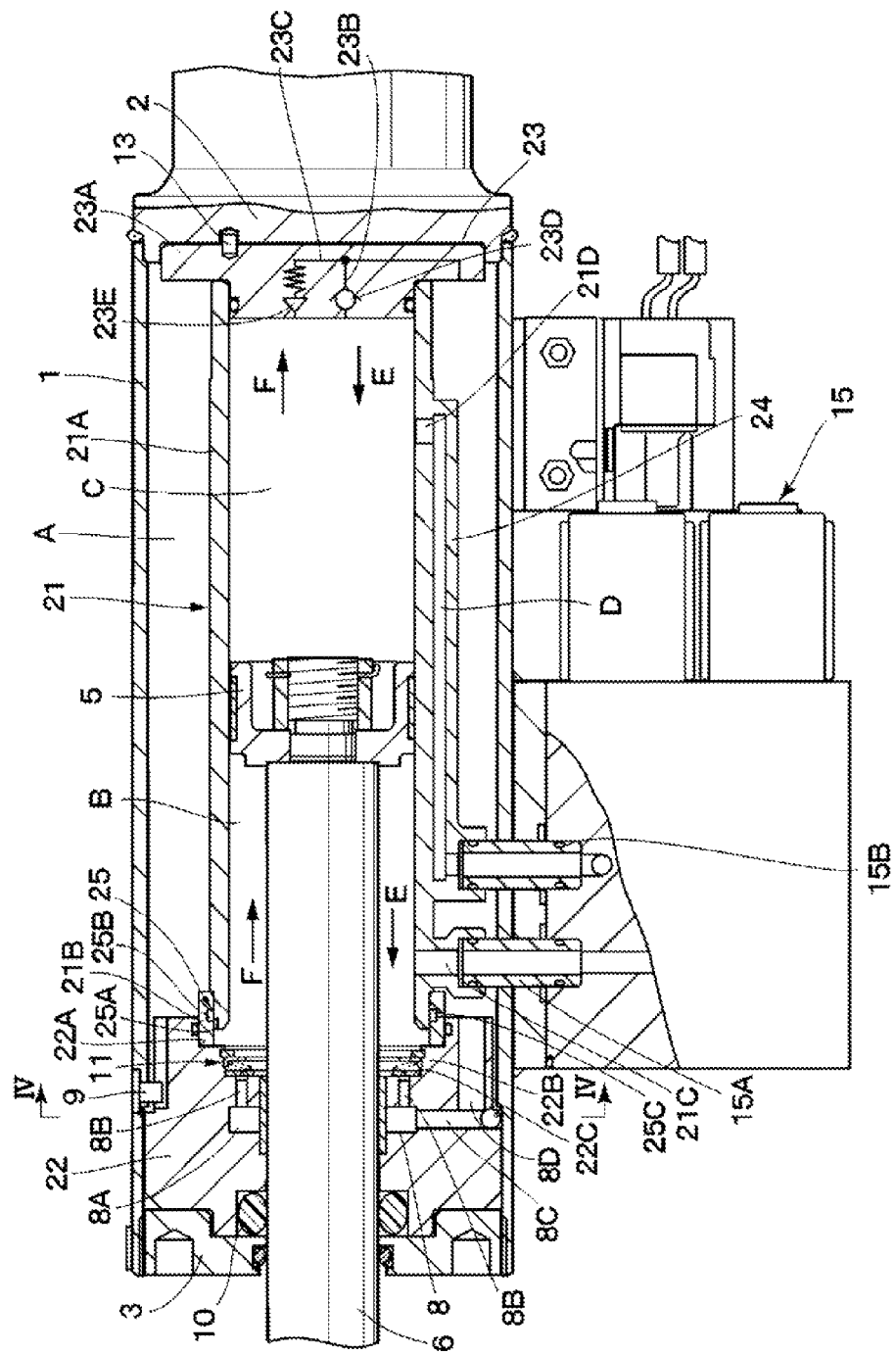
FIG. 3 is a vertical cross-sectional view illustrating a hydraulic shock absorber configured to be horizontally mounted according to a second embodiment.

Next, FIGS. 3 and 4 illustrate a second embodiment of the present invention. According to the second embodiment, an inner tube as the cylinder comprises two tubular bodies including a tubular body that serves as the piston sliding portion, and a tubular body that serves as the large-diameter portion. In the description of the second embodiment, similar components to the above-described first embodiment will be identified by the same reference numerals, and descriptions thereof will be omitted below.

In FIG. 3, reference numeral 21 denotes an inner tube as a cylinder employed in the second embodiment. The inner tube 21 is configured in a substantially similar manner to the inner tube 4 described in the description of the first embodiment, and is disposed coaxially within the outer tube 1. The inner tube 21 includes a tubular body 21A as the cylindrical tubular body and a large-diameter tube 21B as the large-diameter portion. The tubular body 21A serves as the piston sliding portion on which the piston 5 slides, and axially extends. The large-diameter tube 21B is disposed to be fitted to the left end side of the tubular body 21A, and is formed so as to have a diameter increased radially outwardly. The large-diameter tube 21B is fixedly attached integrally by the welding means in a state fitted to the outer circumferential side of the left end of the tube body 21A.

The outer circumferential side of the larger-diameter tube 21B of the inner tube 21 is fittedly attached in a recessed portion 22A of a rod guide 22, which will be described below. A gas release passage 25, which will be described below, is formed at the tubular body 21A and the large-diameter tube 21B. Further, a radially extending oil hole 21C is formed at the left end side of the tubular body 21A and a right-side position relative to the large-diameter tube 21B. This oil hole 21C is used to introduce or discharge the oil in the rod-side chamber B to the damping force adjustment apparatus 15 via the rod-side connection passage 15A. Further, another oil hole 21D is formed at the tubular body 21A of the inner tube 21 at a position axially spaced apart from the oil hole 21C (to the right of the oil hole 21C as viewed in FIG. 3). The oil hole 21D is formed as a radial hole that establishes constant communication between the bottom oil chamber C and the intermediate chamber D.

Reference numeral 22 denotes the rod guide employed in the second embodiment. The rod guide 22 is configured in a substantially similar manner to the rod guide 7 described in the description of the first embodiment. The passage 8 (refer to FIG. 4) is formed at the rod guide 22 to establish communication between the reservoir chamber A and the rod-side chamber B. The rod guide 22 includes a stepped recessed portion 22A formed at the right end side of the rod guide 22 so as to surround the piston rod 6. The large-diameter tube 21B of the inner tube 21 is attached to the rod guide 22 by being fitted to the inner circumferential side of the recessed portion 22A from inside. The recessed portion 22A of the rod guide 22 includes a valve mounting portion 22B for mounting the valve mechanism 11 at the back (bottom) side of the recessed portion 22A, and a seat surface 22C which the plate-like valve 11A is seated on and separated from, in a similar manner to the valve mounting portion 7B and the seat surface 7C described in the description of the first embodiment.

Reference numeral 23 denotes a base valve employed in the second embodiment. The base valve 23 is configured in a similar manner to the base valve 12 described in the description of the first embodiment. The base valve 23 includes a valve body 23A, a first passage portion 23B and a second passage portion 23C, a first check valve 23D, and a second damping force generation mechanism 23E. The valve body 23A is fixedly attached by being fitted between the inner surface of the base cap 2 and the right end of the inner tube 21. The first passage portion 23B and the second passage portion 23C are formed at the valve body 23A in a relationship parallel with each other. The first check valve 23D is provided at the first passage portion 23B of the valve body 23A. The second damping force generation mechanism 23E is provided at the second passage portion 23C of the valve body 23A.

Reference numeral 24 denotes an intermediate wall employed in the second embodiment. The intermediate wall 24 is configured in a substantially similar manner to the intermediate wall 14 described in the description of the first embodiment. The intermediate chamber D is defined independent of the reservoir chamber A between the outer tube 1 and the inner tube 21.

Reference numeral 25 denotes a gas release passage employed in the second embodiment. The gas release passage 25 is configured in a substantially similar manner to the gas release passage 16 described in the description of the first embodiment, and is used to discharge the gas (air bubbles) in the inner tube 21 to the reservoir chamber A. The gas release passage 25 includes a cutout portion 25A, an annular groove portion 25B, and a narrow hole 25C. The cutout portion 25A is formed on the outer circumference at one-side end (the left-side end as viewed in FIG. 3) of the tubular body 21A of the inner tube 21. Further, the cutout portion 25A is located at the vertically uppermost position of the tubular body 21A of the inner tube 21, and has a small flow passage area. The annular groove portion 25B and the narrow hole 25C are formed at the large-diameter tube 21B of the inner tube 21.

The annular groove portion 25B of the gas release passage 25 extends along the entire circumference of the large-diameter tube 21B in the circumferential direction. The vertically uppermost portion of the annular groove portion 25B as viewed in FIG. 3 is located at a position in communication with the cutout portion 25A of the tubular body 21A. The narrow hole 25C of the gas release passage 25 is formed in the radial direction of the large-diameter tube 21B so as to be in communication with the lowermost portion of the annular groove portion 25B. The gas can be released even though the narrow hole 25C of the gas release passage 25 is positioned at the lower side for the following reason. The inner tube 4 is entirely filled with the oil. A small amount of air introduced at the time of assembling is left in the inner tube 21 at first, and this air is accumulated at the end of the uppermost portion of the inner tube 5. Therefore, the oil containing the air is pushed out from the cutout portion 25A into the annular groove portion 25B. After that, the air is guided to the lower side by an oil flow, and is discharged from the narrow hole 25C at the lowermost portion. Since the reservoir is filled with the oil and the gas, discharging the oil at the upper side of the reservoir chamber leads to a discharge of the oil into the gas, resulting in occurrence of aeration and a reverse flow of the gas in the reservoir into the cylinder, which can be prevented according to the configuration of the present embodiment. More specifically, the narrow hole 25C is constituted by a small hole extending vertically as viewed in FIG. 3. The passage area of the narrow hole 25C is appropriately set so as to be able to obtain a required damping force.

For example, when a small amount of the oil in the rod-side chamber B flows into the cutout portion 25A of the tubular body 21A during an extension stroke of the piston rod 6, the gas (air bubbles) left in the inner tube 21 is guided so as to be introduced from the cutout portion 25A into the annular groove portion 25B of the large-diameter tube 21B together with this oil. Then, the gas introduced into the annular groove portion 25B is discharged from this annular groove portion 25B into the reservoir chamber A via the narrow hole 25C at the lower side.

In this manner, the thus-configured second embodiment can provide an effect substantially similar to the above-described first embodiment. Especially, in the second embodiment, the inner tube 21 as the cylinder is constituted by the tubular body 21A, which serves as the piston sliding portion and axially extends, and the large-diameter tube 21B as the large-diameter portion. This large-diameter tube 21B is configured to be fixedly attached integrally by the welding means in a state fitted to the outer circumferential side of the left end of the tubular body 21A.

Therefore, the inner tube 21 can be formed with use of two tubular bodies, by which it is possible to easily form the large-diameter portion (i.e., the large-diameter tube 21B) at the end of the inner tube 21. The inner tube 21 can be assembled to the rod guide 22 by fitting the recessed portion 22A of the rod guide 22 to the outer circumferential (outer diameter) side of the large-diameter tube 21B, whereby the assemblability can be improved.

Further, the gas release passage 25 is constituted by the cutout portion 25A, the annular groove portion 25B, and the narrow hole 25C. The cutout portion 25A is formed at the outer circumference at the left-side end of the tubular body 21A, and is located at the vertically uppermost position. The annular groove portion 25 and the narrow hole 25C are formed at the large-diameter tube 21B of the inner tube 21. Therefore, the gas (air bubbles) can be introduced from the inner circumferential side of the large-diameter tube 21B into the cutout portion 25A while being easily and effectively discharged into the reservoir chamber A via the annular groove portion 25B and the narrow hole 25C.

Figure 5:
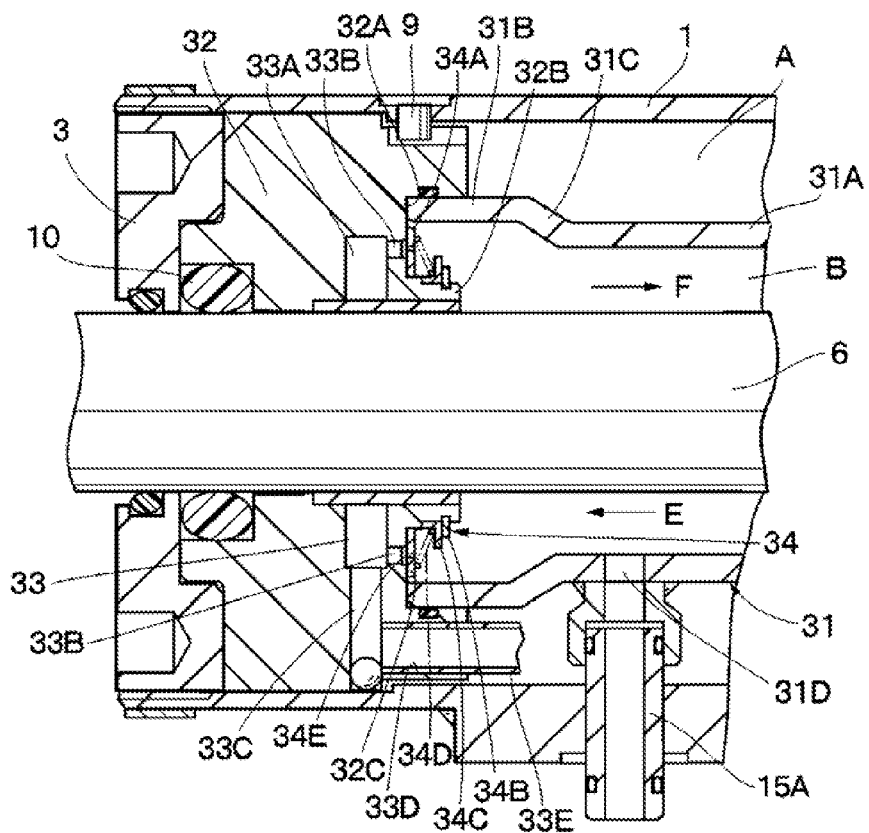
FIG. 5 is a partial cross-sectional view illustrating a hydraulic shock absorber configured to be horizontally mounted according to a third exemplary embodiment in a partially enlarged manner.

Next, FIG. 5 illustrates a third embodiment of the present invention. According to the third embodiment, a valve mechanism 34 is disposed between a large-diameter portion 31B of a cylinder and a valve mounting portion 32B of a rod guide. The valve mechanism 34 is disposed at the outer circumferential side of the valve mounting portion 32B. In the following description of the third embodiment, similar components to the above-described first embodiment will be identified by the same reference numerals, and descriptions thereof will be omitted below.

In FIG. 5, reference numeral 31 denotes an inner tube as a cylinder employed in the third embodiment. The inner tube 31 is configured in a substantially similar manner to the inner tube 4 described in the description of the first embodiment. The inner tube 31 includes a tubular portion 31A, a large-diameter portion 31B, and a tapered portion 31C. The outer circumferential side of the large-diameter portion 31B of the inner tube 31 is attached by being fitted in a recessed portion 32A of a rod guide 32, which will be described below. A gas release passage (not illustrated) is formed at the large-diameter portion 31B, for example, in a similar manner to the gas release passage 16 described in the description of the first embodiment. Further, a radially extending oil hole 31D is formed at the left end side of the tubular portion 31A at a right-side position relative to the large-diameter portion 31B. This oil hole 31D is used to introduce or discharge the oil in the rod-side chamber B into the damping force adjustment apparatus 15 via the rod-side connection passage 15A.

Reference numeral 32 denotes a rod guide employed in the third embodiment. The rod guide 32 is configured in a substantially similar manner to the rod guide 7 described in the description of the first embodiment, and includes a passage 33, which will be described below, to establish communication between the reservoir chamber A and the rod-side chamber B. The rod guide 32 includes the bottomed cylindrical recessed portion 32A and a stepped tubular valve mounting portion 32B at the left end side of the rod guide 32. The valve mounting portion 32B axially extends along the outer circumferential side of the piston rod 6 from the back (bottom) side of the recessed portion 32A, and axially protrudes. In this manner, the valve mounting portion 32B is formed as a stepped tubular body.

The large-diameter portion 31B of the inner tube 31 is attached by being fitted at the inner circumferential side of the recessed portion 32A of the rod guide 32 from inside. A valve mechanism 34, which will be described below, is mounted in the valve mounting portion 32B of the rod guide 32 at an inner position of the recessed portion 32A. The valve mechanism 34 is positioned inside the recessed portion 32A. The back (bottom) side of the recessed portion 32A forms a seat surface 32C, which a plate-like valve 34A is seated on and separated from. The plate-like valve 34 will be described below. This seat surface 32C constitutes a seat portion, which is a part of the valve mechanism 34, and is located so as to face the rod-side chamber B.

A passage 33 is formed at the rod guide 32 to establish communication between the reservoir chamber A and the rod-side chamber B. The passage 33 is configured in a similar manner to the passage 8 described in the description of the first embodiment. The passage 33 includes an annular passage portion 33A, a plurality of axial passage portions 33B, one or more radial passage portion(s) 33C, one or more communication hole(s) 33D, and one or more oil introduction pipe(s) 33E. Alternatively, the passage 33 can be configured only using a passage formed at the rod guide 32 without using the oil introduction pipe(s) 33E, by appropriately forming an air release mechanism.

Reference numeral 34 denotes a valve mechanism employed in the third embodiment. The valve mechanism 34 is configured in a substantially similar manner to the valve mechanism 11 described in the description of the first embodiment, and is located at a position allowing the valve mechanism 34 to face the passage 33 (the axial passage portion 33B) of the rod guide 32 in the rod-side chamber B of the inner tube 31. The valve mechanism 34 is disposed between the large-diameter portion 31B of the inner tube 31 and the valve mounting portion 32B of the rod guide 32. Therefore, the third embodiment is different from the first embodiment in terms that the valve mechanism 34 is mounted at the outer circumferential side of the valve mounting portion 32B.

The valve mechanism 34 includes a plate-like valve 34A formed form an annular disk, an annular spring bracket 34C, a valve spring 34D, and a plurality of orifice holes 34E. The plate-like valve 34A formed from an annular disk is inserted along the valve mounting portion 32B to reach a back-side position of the recessed portion 32A of the rod guide 32. In this manner, the plate-like valve 34A is configured to be able to to be seated on and separated from the seat surface 32C. The annular spring bracket 34C is positioned at the outer circumferential side of the valve mounting portion 32B at a position axially spaced apart from the plate-like valve 34A via a retaining ring 34B. The valve spring 34D is disposed between the spring bracket 34C and the plate-like valve 34A, and constantly biases the plate-like valve 34A in a valve closing direction. The plurality of orifice holes 34E is pierced through the plate-like valve 34A.

The plate-like valve 34A of the valve mechanism 34 is set in a closed state by being kept seated on the seat surface 32C of the rod guide 32 by a pressure of the oil flowing from the rod-side chamber B to the passage 33 and the biasing force of the valve spring 34D during an extension stroke of the piston rod 6. At this time, the oil in the rod-side chamber B flows into the passage 33 (the axial passage portion 33B) via the respective orifice holes 34E. As a result, the respective orifice holes 34E applies orifice resistance to the oil flowing from the rod-side chamber B into the passage 33 during the extension stroke of the piston rod 6, thereby generating a damping force in the extension direction. In this manner, the respective orifice holes 34E constitute a first damping force generation mechanism.

On the other hand, during a compression stroke of the piston rod 6, the oil in the reservoir chamber A is pushed so as to flow into the rod-side chamber B via the passage 33. Therefore, the plate-like valve 34A of the valve mechanism 34 is separated from the seat surface 32C (the valve is opened) against the biasing force of the valve spring 34D, serving a so-called suction valve to guarantee that the oil in the server chamber A is sucked into the rod-side chamber B. In this manner, the plate-like valve 34A constitutes a second check valve that allows an oil flow from the reservoir chamber A into the rod-side chamber B.

In this manner, the thus-configured third embodiment can also increase the dimension of the portion where the rod guide 32 is fitted (the recessed portion 32A) by the large-diameter portion 31B formed at the left end side of the inner tube 31, and can provide a substantially similar effect to the first embodiment. Especially, the third embodiment is configured in such a manner that the valve mechanism 34 is positioned at a radially inner side of the large-diameter portion 31B and is mounted at the outer circumferential side of the valve mounting portion 32B of the rod guide 32. Therefore, it is possible to obtain a space where the valve mechanism 34 is mounted between the large-diameter portion 31B and the valve mounting portion 32B, and increase the suction flow amount of the oil sucked by the valve mechanism 34, thereby also realizing reductions in the size and weight of the shock absorber.

Figure 6:
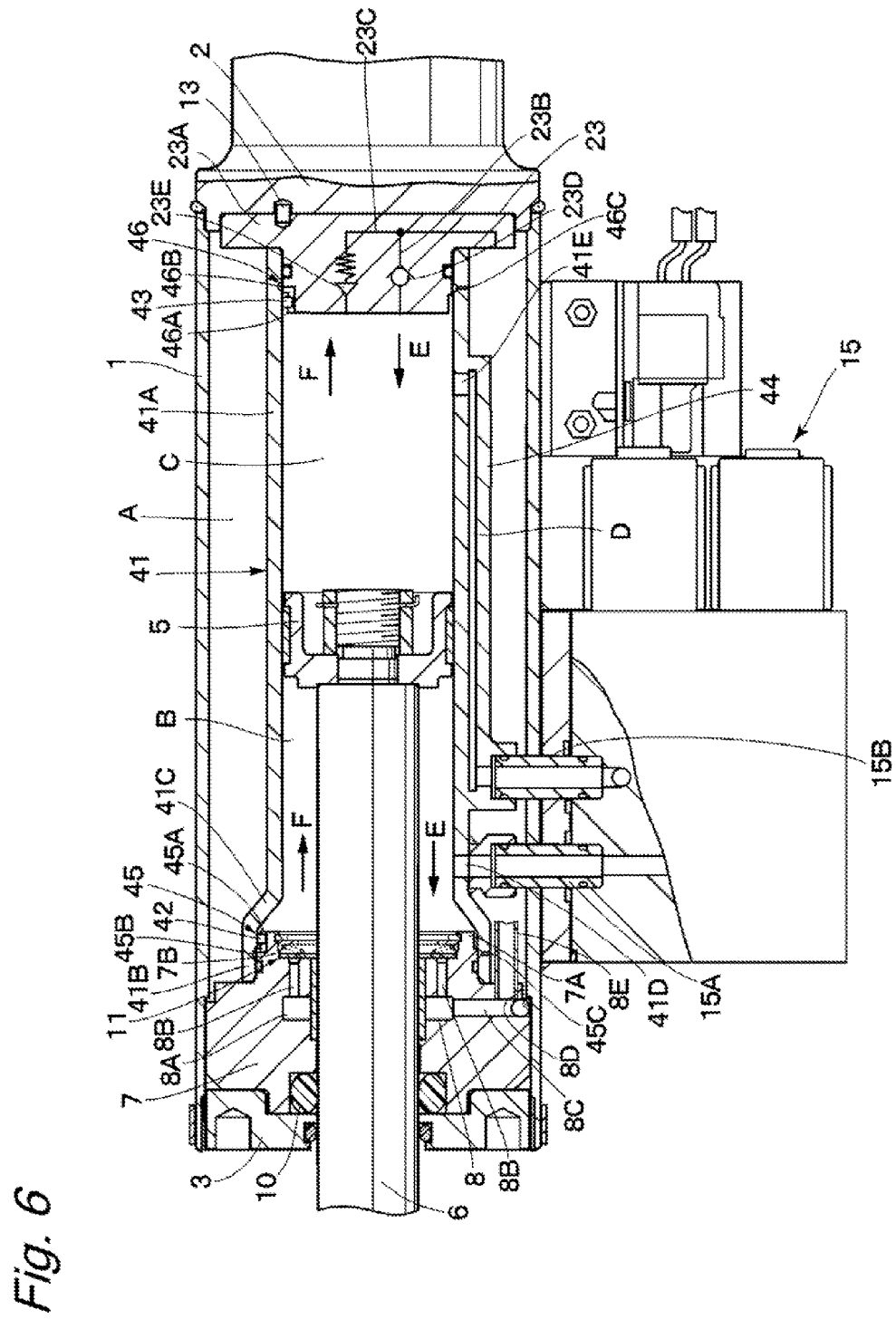
FIG. 6 illustrates a vertical cross-sectional view illustrating a hydraulic shock absorber configured to be horizontally mounted according to a fourth exemplary embodiment.

Next, FIG. 6 illustrates a fourth embodiment of the present invention. According to the fourth embodiment, a rotation preventing pin 42 is disposed at the inner circumferential side of a cylinder 41, and a gas release passage 45 is formed at the inner circumferential side of the cylinder. In the description of the fourth embodiment, similar components to the above-described first embodiment will be identified by the same reference numerals, and descriptions thereof will be omitted below.

In FIG. 6, reference numeral 41 denotes an inner tube as the cylinder employed in the fourth embodiment. The inner tube 41 is configured in a substantially similar manner to the inner tube 4 described in the description of the first embodiment, and includes a tubular portion 41A, a large-diameter portion 41B, and a tapered portion 41C. Further, a radially extending oil hole 41D is formed at the left end side of the tubular portion 41A at a right-side position relative to the large-diameter portion 41B. Another oil hole 41E is formed at the right end side of the tubular portion 41A. The oil hole 41D is used to introduce or discharge the oil in the rod-side chamber B into the damping force adjustment apparatus 15 via the rod-side connection passage 15A. Further, the other oil hole 41E is formed as a radial hole that establish constant communication between the bottom-side oil chamber C and the intermediate chamber D.

A rotation preventing pin 42 is provided at the inner circumferential side of the large-diameter portion 41B to hold the rod guide 7 so as to prevent the rod guide 7 from rotating. The rotation preventing pin 42 may be integrally provided at the inner circumferential side of the large-diameter portion 41B, or may be provided as a separate body from the inner tube 4. Further, a rotation preventing pin 43 is provided at the inner circumference at the right end side of the tubular portion 41A to hold the base valve 23 so as to prevent the base valve 23 from rotating. The rotation preventing pin 43 may be integrally provided on the inner circumference of the right end side of the inner tube 41A, or may be provided as a separate member from the inner tube 41. The base valve 23 is configured in a similar manner to the base valve described in the description of the second embodiment.

Reference numeral 44 denotes an intermediate wall employed in the fourth embodiment. The intermediate wall 44 is configured in a substantially similar manner to the intermediate wall 14 described in the description of the first embodiment. The intermediate chamber D is defined independent of the reservoir chamber A between the outer tube 1 and the inner tube 41. The intermediate wall 44 is integrally formed at the outer circumferential side of the inner tube 41. However, the intermediate wall 44 may be configured so as to be formed as a separate body from the inner tube 41, and disposed at the outer circumferential side of the inner tube 41 by, for example, the welding means. The intermediate wall 44 is formed so as to partially surround the outer circumferential side of the inner tube 41 from the lower side. Further, the intermediate wall 44 axially extends so as to have a predetermined length. The intermediate chamber D is in constant communication with the opposite rod-side chamber C via the radial oil hole 41E formed at the inner tube 41. Further, the opposite rod-side chamber C is in communication with the bottom-side connection passage 15B via the intermediate chamber D.

Reference numeral 45 denotes a gas release passage employed in the fourth embodiment. The gas release passage 45 is configured in a substantially similar manner to the gas release passage 16 described in the description of the first embodiment, and is used to discharge the gas (air bubbles) in the inner tube 41 into the reservoir chamber A. The gas release passage 45 includes a cutout groove portion 45A, an annular groove portion 45B, and a narrow hole 45C. The cutout groove portion 45A is formed on the outer circumference at the other-side end (the right-side end as viewed in FIG. 6) of the tubular recessed portion 7A of the rod guide 7, and is located at a vertically uppermost position as viewed in FIG. 6. The annular groove portion 45B and the narrow hole 45C are formed at the large-diameter portion 41B of the inner tube 41.

The rotation preventing pin 42 of the inner tube 41 is engaged in the cutout groove 45A of the gas release passage 45. Therefore, the large-diameter portion 41B of the inner tube 41 and the rod guide 7 are prevented from rotating relative to each other and are held in a non-rotatable state. Further, the annular groove portion 45B formed on the inner circumferential surface side of the large-diameter portion 41B extends along the entire circumference of the large-diameter portion 41B in the circumferential direction. Further, the vertically uppermost portion of the annular groove portion 45B as viewed in FIG. 6 is positioned so as to be in communication with the cutout groove portion 45A of the rod guide 7. The narrow hole 45C of the gas release passage 45 is formed in the radial direction of the large-diameter portion 41B so as to be communicated with the lowermost portion of the annular groove portion 45B, and is constituted by a vertically extending small hole as viewed in FIG. 6.

For example, when a small amount of the oil in the rod-side chamber B flows into the cutout groove portion 45A of the rod guide 7 during an extension stroke of the piston rod 6, the gas (air bubbles) left in the rod-side chamber B of the inner tube 41 is guided so as to be introduced from the cutout groove portion 45A into the annular groove portion 45B of the large-diameter portion 41B together with this oil. Then, the gas introduced into the annular groove portion 45B of the large-diameter portion 41B is discharged from the annular groove portion 45B into the reservoir chamber A via the narrow hole 45C at the lower side.

Reference numeral 46 denotes another gas release passage employed in the fourth embodiment. The other gas release passage 46 includes a cutout groove portion 46A, an annular groove portion 46B, and a narrow hole 46C. The cutout groove portion 46A is formed on the outer circumference at one-side end (the left-side end as viewed in FIG. 6) of the valve body 23A of the base valve 23, and is located at the vertically uppermost position as viewed in FIG. 6. The annular groove portion 46B and the narrow hole 46C are formed at the inner circumferential side of the right end of the tubular portion 41A of the inner tube 41.

The rotation preventing pin 43 of the inner tube 43 is engaged in the cutout groove portion 46A of the gas release passage 46. Therefore, the tubular portion 41A of the inner tube 41 and the base valve 23 (i.e., the base cap 2) are prevented from rotating relative to each other and are held in a non-rotatable state. Further, the annular groove portion 46B formed on the inner circumferential surface side of the tubular portion 41A extends along the entire circumference of the tubular portion 41A in the circumferential direction. Further, the vertically uppermost portion of the annular groove portion 46B as viewed in FIG. 6 is located at a position in communication with the cutout groove portion 46A of the base valve 23. The narrow hole 46C of the gas release passage 46 is formed in the radial direction of the tubular portion 41A so as to be communicated with the lowermost portion of the annular groove portion 46B, and is constituted by a vertically extending small hole as viewed in FIG. 6.

For example, when a small amount of the oil in the opposite rod-side chamber C flows into the cutout groove portion 46A of the base valve 23 during a compression stroke of the piston rod 6, the gas (air bubbles) left in the opposite rod-side chamber C of the inner tube 41 is guided so as to be introduced from the cutout groove portion 46A into the annular groove portion 46B of the tubular portion 41A together with this oil. Then, the gas introduced into the annular groove portion 46B is discharged from the annular groove portion 46B into the reservoir chamber A via the narrow hole 46C at the lower side.

The fourth embodiment can also increase the outer diameter of the portion (the tubular protrusion 7A) where the rod guide 7 is fitted by the large-diameter portion 41B formed at the left end side of the inner tube 41, and therefore can provide a similar effect to the first embodiment. Further, the gas release passage 45 is formed between the tubular protrusion 7A of the rod guide 7 and the large-diameter portion 41B of the inner tube 41, by which it is possible to easily discharge the gas (air bubbles) left in the inner tube 41 into the reservoir chamber A via the gas release passage 45 during, for example, an extension stroke of the piston rod 6.

Especially, according to the fourth embodiment, the gas release passage 45 can be partially constituted by the cutout groove portion 45A formed at the tubular protrusion 7A of the rod guide 7, and the rotation preventing pin 42 of the inner tube 41 is engaged in the cutout groove portion 45A, which allows the large-diameter portion 41B of the inner tube 41 and the rod guide 7 to be held in a non-rotatable state. In other words, the cutout groove portion 45A of the rod guide 7 can be used for both gas release and rotation prevention.

Further, the gas release passage 46 can be partially constituted by the cutout groove portion 46A formed at the valve body 23A of the base valve 23, and the rotation preventing pin 43 of the inner tube 41 is engaged in the cutout groove portion 46A, which allows the tubular portion 41A of the inner tube 41 and the base vale 23 to be held in a non-rotatable state. In other words, the cutout groove portion 46A of the base valve 23 can be used for both gas release and rotation prevention.

The above-described fourth embodiment has been described based on the example in which the annular groove portion 45B partially constituting the gas release passage 45 is formed on the inner circumferential surface side of the large-diameter portion 41B. However, the present invention is not limited thereto, and may be configured in such a manner that, for example, an annular groove portion is formed at the rod guide 7 so as to be communicated with the cutout groove portion 45A of the rod guide 7. In this case, the fourth embodiment can be realized by configuring the shock absorber in such a manner that the annular groove portion extends along the entire circumference of the rod guide 7 in the circumferential direction, the vertically uppermost portion of the annular groove portion is in communication with the cutout groove portion 45A, and the lowermost portion of the annular groove portion is in communication with the narrow hole 45C of the large-diameter portion 41B.

Further, similarly, regarding the gas release passage 46 formed at the base valve 23, the annular groove portion 46B does not necessarily have to be formed at the inner circumferential surface side of the tubular portion 41A. For example, the shock absorber may be configured, for example, in such a manner that the annular groove portion is formed at the valve body 23A so as to be communicated with the cutout groove portion 46A of the valve body 23A. Further, the shock absorber may be configured in such a manner that the rotation preventing pin 43 is omitted, and a protrusion is formed from the inner circumferential side of the tubular portion 41A toward the base valve 12. In this case, the fourth embodiment can be realized by configuring the shock absorber in such a manner that the annular groove portion extends along the entire circumference of the valve body 23A in the circumferential direction, the vertically uppermost portion of the annular groove portion is in communication with the cutout groove portion 46A, and the lowermost portion of the annular groove portion is in communication with the narrow hole 46C of the tubular portion 41A.

Further, the above-described embodiments have been described based on the example of the double tube hydraulic shock absorber as a horizontally mounted shock absorber used with a rail vehicle. However, the present invention is not limited thereto, and may be employed for, for example, a hydraulic shock absorber for an automobile (in this case, as, for example, a vertically mounted shock absorber that damps a vertical oscillation), and can be also employed for shock absorbers used for various kinds of machines that become an oscillation source, a building or construction, and the like.

Further, the above-described embodiments have been described based on the example in which the large-diameter portion 4B is formed at the rod guide side, and the valve mechanism 11 is provided therein. However, the large-diameter portion may be provided at the base valve 12, and the valve mechanism may be provided therein.

As described above in the descriptions of the embodiments, the valve mechanism is configured to have the annular plate-like valve with the piston rod inserted on the inner side. Due to this configuration, the plate-like valve of the valve mechanism disposed at the rod guide from the inner side of the large-diameter portion of the inner tube can be formed as a plate-like valve having a large outer diameter according to the dimension of the large-diameter portion, by which it is possible to increase the suction flow amount when the plate-like valve is opened. Further, the valve mechanism is lighter in weight compared to the conventionally used puppet valve, and therefore has excellent responsiveness.

In this case, the plate-like valve is formed so as to have a large diameter than the outer diameter of the piston. Further, the valve mechanism is configured so as to allow a flow from the reservoir chamber into the rod-side chamber, and be positioned on the surface of the rod guide that faces the rod-side chamber. In addition, the seat portion, which constitutes a part of the valve mechanism, is formed on the surface of the rod guide that faces the rod-side chamber. As a result, the valve mechanism can be configured as a check valve in which, for example, the plate-like valve is seated on and separated from the seat portion to allow a flow of the hydraulic fluid from the reservoir chamber to the rod-side chamber.

The large-diameter portion of the cylinder may be formed as a separate member from the piston sliding portion of the cylinder in which the piston is slidably and fittedly inserted. As a result, the cylinder can be constructed using two tubular bodies, and the tubular body as the large-diameter portion can be easily formed at the end of the piston sliding portion with use of a fitting means or the like. Further, the rod guide can be mounted by being fitted to this large-diameter portion (tubular body), thereby increasing assemblability.

The rod guide can be attached by being fitted to the large-diameter portion of the cylinder from the inner circumferential side or the outer circumferential side. In other words, the shock absorber may be configured in such a manner that the rod guide is mounted by being fitted to the inner circumferential side of the large-diameter portion, or the rod guide is mounted by being fitted to the outer circumferential side of the large-diameter portion.

According to the above-described configuration, it is possible to increase the outer diameter of the portion at which the rod guide is fitted due to the large-diameter portion provided at the one end side of the cylinder to obtain a space for mounting the valve mechanism while increasing the suction flow amount of hydraulic fluid sucked by the valve mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-218343 filed on Sep. 28, 2012.

The entire disclosure of Japanese Patent Application No. 2012-218343 filed on Sep. 28, 2012 including specification, claims, drawings and summary are incorporated herein by reference in its entirety.

What is claimed is:

1. A shock absorber comprising:
    an outer tube;
    an annular cylinder in which hydraulic fluid is sealingly contained and that is disposed in the outer tube;
    a reservoir chamber in which hydraulic fluid and gas are sealingly contained;
    a piston slidably and fittedly inserted in the cylinder and dividing an interior of the cylinder into a rod-side chamber and an opposite rod-side chamber;
    a piston rod extending from one end of the cylinder to an outside; and
    a rod guide disposed at one end side of the cylinder and configured to slidably support the piston rod,
    wherein the cylinder includes a piston sliding portion on which the piston slides, and a large-diameter portion provided integrally with the piston sliding portion at one end side of the piston sliding portion so as to have a diameter increased radially outwardly,
    the piston sliding portion has an inner diameter and an outer diameter,
    the large-diameter portion has an inner diameter and an outer diameter,
    the inner diameter of the large-diameter portion is larger than the inner diameter of the piston sliding portion,
    the outer diameter of the large-diameter portion is larger than the outer diameter of the piston sliding portion,
    the large-diameter portion being supported by the rod guide by being fitted to the rod guide so that the one end side of the cylinder is positioned relative to the outer tube,
    a passage is provided at the rod guide so as to establish communication between the rod-side chamber and the reservoir chamber, and
    a valve mechanism is disposed at the passage.

2. The shock absorber according to claim 1, wherein the valve mechanism includes an annular plate-shaped valve with the piston rod extending through an inner side of the plate-shaped valve.

3. The shock absorber according to claim 1, wherein the valve mechanism allows a flow from the reservoir chamber into the rod-side chamber, and is disposed on a surface of the rod guide that faces the rod-side chamber.

4. The shock absorber according to claim 1, wherein a seat surface, which constitutes a part of the valve mechanism, is formed at a surface of the rod guide that faces the rod-side chamber.

5. The shock absorber according to claim 4, wherein the passage includes:
an annular passage portion which extends entirely circumferentially around an outer circumferential side of the piston rod; and
a plurality of axial passage portions formed so as to be spaced apart from one another along a circumferential direction of the annular passage portion and axially extending between the seat portion and the annular passage portion,
wherein the valve mechanism includes a valve configured to be seated on and separated from the seat portion.

6. The shock absorber according to claim 5, wherein a plurality of orifice holes are pierced through the valve.

7. The shock absorber according to claim 5, further including a valve spring configured to constantly bias the valve against the seat portion in a valve-closing direction.

8. The shock absorber according to claim 5, wherein the passage further includes a radial passage portion extending from an outer circumferential side of the annular passage portion radially outwardly, and a communication hole for establishing constant communication between the radial passage portion and the reservoir chamber.

9. The shock absorber according to claim 1, wherein the large-diameter portion of the cylinder is formed of a separate member from the piston sliding portion of the cylinder, and is provided integrally with the piston sliding portion of the cylinder.

10. The shock absorber according to claim 1, wherein the rod guide is fitted to one of an inner circumference and an outer circumference of the large-diameter portion,
wherein the valve mechanism includes an annular plate-shaped valve with the piston rod extending through an inner side of the plate-shaped valve, and the plate-shaped valve is located in the large-diameter portion.

11. The shock absorber according to claim 1, wherein the cylinder includes a tapered portion between the piston sliding portion and the large-diameter portion, the tapered portion being formed in such a manner that a diameter thereof increases toward the large-diameter portion in a tapered manner.

12. The shock absorber according to claim 1, wherein an inner diameter of the large-diameter portion is larger than an outer diameter of the piston sliding portion.

13. A shock absorber comprising:
an outer tube;
an annular cylinder in which hydraulic fluid is sealingly contained and that is disposed in the outer tube;
a reservoir chamber in which hydraulic fluid and gas are sealingly contained;
a piston slidably and fittedly inserted in the cylinder and dividing an interior of the cylinder into a rod-side chamber and an opposite rod-side chamber;
a piston rod extending from one end of the cylinder to an outside; and
a rod guide disposed at one end side of the cylinder and configured to slidably support the piston rod,
wherein the cylinder includes a piston sliding portion on which the piston slides, and a large-diameter portion provided integrally with the piston sliding portion at one end side of the piston sliding portion so as to have a diameter increased radially outwardly,
the large-diameter portion being supported by the rod guide by being fitted to the rod guide so that the one end side of the cylinder is positioned relative to the outer tube,
wherein a passage is provided at the rod guide so as to establish communication between the rod-side chamber and the reservoir chamber,
wherein a valve mechanism is disposed at the passage,
wherein the valve mechanism includes an annular plate-shaped valve with the piston rod extending through an inner side of the plate-shaped valve,
wherein an outer diameter of the plate-shaped valve is larger than an outer diameter of the piston and is smaller than an inner diameter of the large-diameter portion.

14. A shock absorber comprising:
an outer tube,
an annular cylinder in which hydraulic fluid is sealingly contained and that is disposed in the outer tube;
a reservoir chamber in which the hydraulic fluid and gas are sealingly contained;
a piston slidably provided in the cylinder and dividing an interior of the cylinder into a rod-side chamber and an opposite rod-side chamber;
a piston rod extending from one end of the cylinder to an outside; a base valve defining the opposite rod-side chamber and the reservoir chamber;
a rod guide disposed at one end side of the cylinder and configured to slidably support the piston rod; and
a first passage and a second passage through which the hydraulic fluid flows according to a movement of the piston,
wherein a large-diameter portion, having a larger diameter than a portion on which the piston slides, is provided integrally with the cylinder at the one end side of the cylinder, the inner diameter of the large-diameter portion having a single diameter and the large-diameter portion extending in the axial direction of the cylinder, the large-diameter portion being supported by the rod guide by being fitted to the rod guide so that the one end side of the cylinder is positioned relative to the outer tube,
wherein a first damping force generation mechanism and a first check valve are disposed at the first passage, the first damping force generation mechanism being configured to generate a damping force by controlling a flow of the hydraulic fluid flowing from the rod-side chamber during an extension stroke, the first check valve being provided at the base valve and being configured to allow a flow of the hydraulic fluid from the reservoir chamber into the opposite rod-side chamber,
wherein a second damping force generation mechanism and a second check valve are disposed at the second passage, the second damping force generation mechanism being configured to generate a damping force by controlling a flow of the hydraulic fluid flowing from the opposite rod-side chamber during a compression stroke, the second check valve being provided at the rod-side chamber and being configured to allow a flow of the hydraulic fluid from the reservoir chamber into the rod-side chamber, the second check valve being located in the large-diameter portion, and wherein at least a part of the second passage is formed at the rod guide.

15. The shock absorber according to claim 14, wherein the valve mechanism includes an annular plate-shaped valve with the piston rod extending through an inner side of the plate-shaped valve, and wherein an outer diameter of the plate-shaped valve is larger than an outer diameter of the piston.

16. The shock absorber according to claim 14, wherein the valve mechanism allows a flow from the reservoir chamber into the rod-side chamber, and is disposed on a surface of the rod guide that faces the rod-side chamber, and wherein a seat surface, which constitutes a part of the valve mechanism, is formed at a surface of the rod guide that faces the rod-side chamber.

17. The shock absorber according to claim 14, wherein the large-diameter portion of the cylinder is formed of a separate member from the portion of the cylinder on which the piston slides, and is provided integrally with the portion of the cylinder on which the piston slides.

18. The shock absorber according to claim 14, wherein the rod guide is fitted to one of an inner circumference and an outer circumference of the large-diameter portion.

19. The shock absorber according to claim 14, wherein the cylinder includes a tapered portion between the portion on which the piston slides and the large-diameter portion, the tapered portion being formed in such a manner that a diameter thereof increases toward the large-diameter portion in a tapered manner.

20. The shock absorber according to claim 14, wherein an inner diameter of the large-diameter portion is larger than an outer diameter of the portion on which the piston slides.

* * * * *